United States Patent
Eich et al.

(10) Patent No.: US 6,849,027 B2
(45) Date of Patent: Feb. 1, 2005

(54) METHOD AND APPARATUS FOR DIAGNOSING A MALFUNCTION OF A CLUTCH ACTUATOR

(75) Inventors: Jürgen Eich, Buhl (DE); Klaus Küpper, Buhl (DE); Alexander Schweizer, Walzbachtal-Jöhlingen (DE); Ralf Enderlin, Bühl/Neusatz (DE); Thomas Jäger, Meckenbeuren (DE); Martin Vornehm, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/735,182

(22) Filed: Dec. 12, 2003

(65) Prior Publication Data
US 2004/0127329 A1 Jul. 1, 2004

Related U.S. Application Data

(62) Division of application No. 10/375,821, filed on Feb. 27, 2003, which is a division of application No. 09/943,409, filed on Aug. 30, 2001, now Pat. No. 6,547,699.

(30) Foreign Application Priority Data

Aug. 30, 2000 (DE) .......................... 100 42 554

(51) Int. Cl.⁷ .................. B60K 41/02; G06F 17/00; G06F 19/00; G06F 7/00
(52) U.S. Cl. .................. 477/34; 477/174; 477/180; 477/906; 701/68
(58) Field of Search .................. 477/34, 174, 180, 477/906; 701/67–68; 192/3.51; 73/118.1

(56) References Cited

U.S. PATENT DOCUMENTS

| 4,150,497 A | | 4/1979 | Weber |
|---|---|---|---|
| 4,563,987 A | | 1/1986 | Geary et al. |
| 4,671,397 A | | 6/1987 | Asagi et al. |
| 4,965,730 A | | 10/1990 | Kurihara et al. |
| 5,649,880 A | * | 7/1997 | Tsutsui et al. ............. 477/125 |
| 5,723,779 A | * | 3/1998 | Hara et al. ................. 73/118.1 |
| 5,847,272 A | * | 12/1998 | Schneider et al. ......... 73/118.1 |
| 5,982,280 A | | 11/1999 | Fahrbach et al. |
| 6,189,665 B1 | * | 2/2001 | Yamamoto et al. ........ 192/3.58 |
| 6,223,873 B1 | | 5/2001 | Ahnert et al. |
| 6,424,903 B1 | | 7/2002 | Amisano et al. |
| 6,517,464 B2 | | 2/2003 | Yamazaki et al. |
| 6,536,569 B2 | * | 3/2003 | Nishimura ................. 192/3.58 |
| 6,536,573 B2 | * | 3/2003 | Nagler et al. ............. 192/85 R |
| 6,547,699 B2 | | 4/2003 | Eich et al. |
| 2001/0008199 A1 | | 7/2001 | Ahnert et al. |
| 2001/0037927 A1 | | 11/2001 | Nagler et al. |
| 2002/0055807 A1 | | 5/2002 | Zimmermann et al. |

* cited by examiner

*Primary Examiner*—Tisha Lewis
(74) *Attorney, Agent, or Firm*—Darby & Darby

(57) ABSTRACT

In a method and apparatus for diagnosing a malfunction in a clutch actuator of a motor vehicle, the actual position of the clutch actuator is measured by a position sensor. Simultaneously, an estimated position of the clutch actuator is calculated by an emulation unit that emulates the function of the clutch actuator. Malfunctions of the clutch-actuator are diagnosed by comparing the actual, measured position to the estimated position.

4 Claims, 2 Drawing Sheets

METHOD AND APPARATUS FOR DIAGNOSING A MALFUNCTION OF A CLUTCH ACTUATOR

CROSS REFERENCE TO RELATED APPLICATIONS

This application is a divisional application of U.S. patent application Ser. No. 10/375,821, filed on Feb. 27, 2003, which is a divisional application of U.S. patent application Ser. No. 09/943,409, filed Aug. 30, 2001, now U.S. Pat. No. 6,547,699, issued on Apr. 15, 2003, which are hereby incorporated by reference in their entirety.

BACKGROUND OF THE INVENTION

The present invention relates to a method and apparatus for diagnosing a malfunction in a clutch actuator of a motor vehicle. The clutch actuator receives an input command signal of variable magnitude from a control unit that may belong to an automatically shifting transmission, an automated clutch or a continuously variable transmission. The input command signal controls the position of the clutch actuator and thereby sets the state of engagement of the clutch. As a common trait of the inventive method as well as existing methods, the clutch-actuator position or state of engagement of the clutch is measured and an output signal corresponding to the measured actuator position is made available.

In the search for safety-monitoring concepts for automatically shifting transmissions, it has been found that many critical situations arise mainly in connection with the actuation of the clutch, e.g., if the clutch moves into or out of engagement at times when this is not intended. It is therefore of the highest importance to have real-time information about the current status of the clutch.

In connection with automatic or automated clutches or transmissions, it is a known concept to provide a measurement signal that indicates the position of the clutch actuator. However, as a matter of principle, the possibility of failure has to be taken into account for a position-sensor of the clutch actuator just as for any other technical component. Thus, the position of the clutch actuator as indicated by the sensor is not unconditionally reliable. Consequently, in connection with monitoring the safety of automated shift transmissions, it is highly advisable to include the clutch position or clutch actuator position in the monitoring process.

As an attempt to satisfy this need, a known concept of monitoring the position sensor of the clutch actuator involves a plausibility test based on minimum and maximum signal values. However, this allows only certain extreme malfunctions of the sensor to be discovered, e.g., a short circuit or a break in the cable.

OBJECT OF THE INVENTION

The present invention therefore has the objective of providing a method of diagnosing malfunctions in a clutch actuator, whereby the position of the clutch actuator and the state of engagement of the clutch can be monitored with a higher degree of reliability in comparison to known state-of-the-art methods.

The invention further has the objective of providing an apparatus in the form of a clutch-actuating system in which the safe functioning of the clutch is assured in accordance with the inventive method.

SUMMARY OF THE INVENTION

The objective outlined above is met by the method according to the invention, as follows: The clutch actuator receives an input command signal of variable magnitude from a control unit that may belong to an automatically shifting transmission, an automated clutch or a continuously variable transmission. The input command signal controls the position of the clutch actuator and thereby sets the state of engagement of the clutch. The clutch-actuator position or state of engagement of the clutch is measured, and a position signal corresponding to the actually measured actuator position is made available. The method according to the invention is distinguished in that the aforementioned input command signal is simultaneously applied to the input of an emulation model of the actuator. The emulation model calculates a signal representing a theoretically estimated actuator position. The respective signals for the actual and theoretical actuator positions are compared to each other in a comparator unit which sends the result of the comparison to an arithmetic unit. The arithmetic unit, in turn, generates a status signal that characterizes the degree of functionality of the clutch actuator.

The object of the invention is further met by a variation of the inventive method, wherein the position signal corresponding to the measured actuator position is entered as an input into a processor unit for the function of the clutch and the dynamic behavior of the engine, which generates an rpm-signal representing the actually measured rpm-rate of the engine. The position signal corresponding to the measured actuator position is simultaneously entered as an input into a calculator unit, which generates a theoretical rpm-signal representing a theoretically estimated rpm-rate of the engine based on the position signal and the engine torque. The respective signals for the actually measured and theoretically estimated rpm-rate are compared to each other in a comparator unit which produces a comparison signal that is indicative of the functionality of the clutch actuator.

The objective stated above is also accomplished by a further variation of a method for diagnosing a malfunction of a clutch, with the following elements: A first electrical signal generated by a first sensor indicates if the motor vehicle is standing still. A second electrical signal generated by a second sensor indicates if a gear in the automatically shifting transmission cannot be synchronized within a prescribed time interval. A third electrical signal generated by a third sensor indicates if the engine is running. The first, second and third electrical signals are brought together and evaluated in a logic AND-member which sets an error flag indicating a malfunction in the clutch-actuating system if all three signals are affirmative.

As a further contribution to meet the above objective, the invention provides an apparatus in the form of a clutch-actuating system wherein the actuation of a clutch is automated and the safe functioning of the clutch is assured through the method according to the invention as described herein, including its different embodiments and variations.

The method according to the present invention has the principal advantage that it offers a far-reaching degree of detection of malfunctions of a clutch actuator in a relatively simple way by correlating the actual position of the clutch actuator as measured by a sensor with a theoretically estimated actuator position provided by an emulation model of an actuator as a function of the position-controlling input command signal.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Preferred embodiments of the invention will be described below in detail based on the attached drawings, wherein.

DETAILED DESCRIPTION OF PREFERRED EMBODIMENTS

Figure 1:
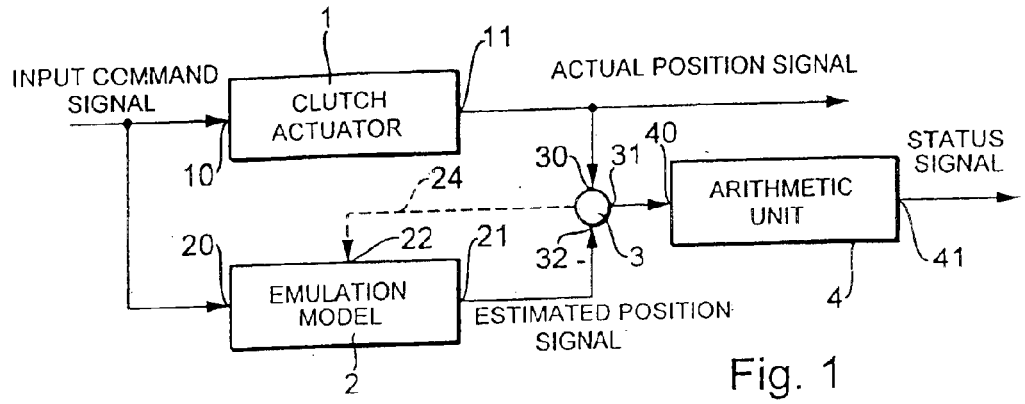
FIG. 1 represents a block diagram of a first embodiment of the invention.

FIG. 1 shows a clutch actuator 1 and an emulation model 2 of the clutch actuator 1. The emulation model calculates the position that the actuator should theoretically occupy based on a current value of a position-controlling input command signal that is simultaneously fed to the input 10 of the clutch actuator 1 and the input 20 of the emulation model 2. The position-controlling input command signal is generated by an automatically shifting transmission. The clutch actuator 1 moves to or occupies a position that is a function of the position-controlling input command signal. The actual position of the clutch actuator 1 at each point in time is measured by a sensor and made available as an electrical output signal (representing the actually measured actuator position) at an output 11 of the clutch actuator 1.

Based on the position-controlling input command signal that is simultaneously fed to the input 20 of the emulation model 2, the latter calculates a position value of a position that the clutch actuator should theoretically occupy based on the current value of the position-controlling input command signal. The theoretical position value is presented at the output 21 of the emulation model 2. The respective signals at the outputs 11 and 21 for the actually measured actuator position and the theoretically estimated actuator position are brought together in a comparator unit 3, e.g., a summation stage, where they are compared to each other. The comparator unit 3 delivers the result of the comparison (in the form of a comparison signal at output 31) to an arithmetic unit 4 which, in turn, generates a status signal at output 41. If the respective signals for the actually measured and theoretically calculated actuator position approximately agree with each other, the arithmetic unit will find, based on an evaluation algorithm, that both the clutch actuator and the position sensor of the clutch actuator are functioning properly. On the other hand, if there is a large discrepancy between the respective signals for the actually measured and theoretically calculated actuator position, the arithmetic unit will determine that there is a malfunction in the clutch actuator and/or the position sensor of the clutch actuator 1.

To compensate for the fact that the actually measured and theoretically estimated signal values would drift apart over time as a result normal friction wear on the clutch, it is recommended to return the comparison signal from the comparator unit 3 through a feedback line 24 to the input 22 of the emulation model 2, so that the normal amount of drifting-apart can be taken into account in calculating the theoretically estimated signal value.

Figure 2:
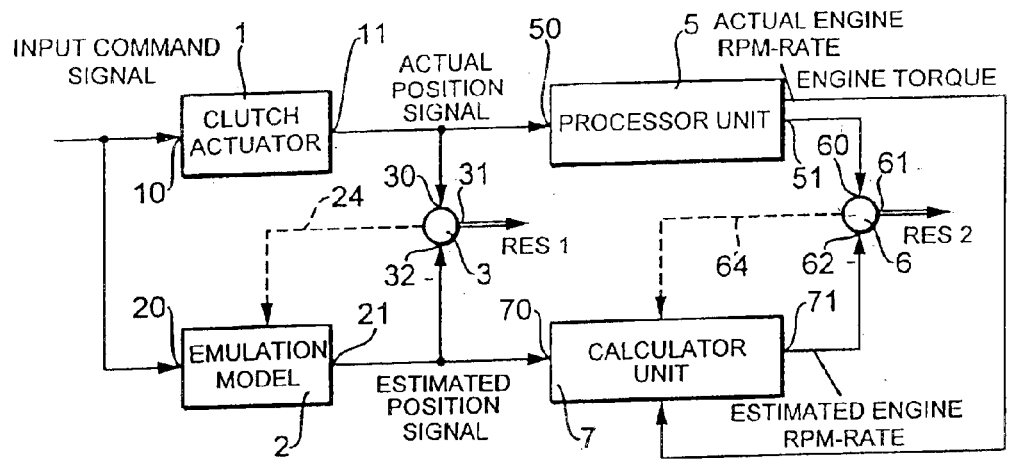
FIG. 2 represents a block diagram of a second embodiment of the invention.

The block diagram of FIG. 2 illustrates an embodiment of the invention where the method steps of FIG. 1 are followed by additional method steps, in which the result of a clutch actuator position or movement is evaluated, i.e., the magnitude or change of the torque that is transmitted by the clutch. The elements in FIG. 2 that correspond to analogous elements in FIG. 1 have the same reference symbols.

The position signal at the output 11 of the clutch actuator 1, which represents the actually measured actuator position, is also fed to the input 50 of a processor unit 5 that for the function of the clutch and the dynamic behavior of the engine, which delivers at its output 51 a signal determined by a sensor, representing the actually measured rpm-rate of the engine. The signal from output 51 is sent to the input 60 of a further comparator unit 6.

Analogously, the signal at the output 21 of the emulation model 2, which represents the theoretically estimated actuator position, is also fed to the input 70 of a calculator unit 7, which calculates a theoretical rpm-rate of the engine based on the theoretically estimated actuator position and the engine torque. The theoretical rpm-signal is sent from the output 71 of the calculator unit 7 to an input 62 of the further comparator unit 6, e.g., a summation stage, in which the signals from outputs 51 and 71 are compared to each other. The comparator unit 6 delivers a comparison result (Res 2) from its output 61 to an arithmetic unit (not shown). The comparison result Res 2, which represents the difference between the actually measured rpm-rate and the theoretically calculated rpm-rate of the engine, is evaluated by the arithmetic unit and used as an indicator for the condition of the clutch. The comparison signal Res1 at the output 31 of the comparator unit 3 is evaluated by the arithmetic unit 4 (described above in the context of FIG. 1) as an indicator for the condition of the clutch actuator.

Thus, the embodiment of FIG. 2 offers additional detection capabilities for malfunctions. For example, if the position sensor of the clutch actuator fails during a start-up phase or a gear-shift phase, the failure will manifest itself within a very short time through a large value of the comparison signal Res 1 at the output 31 of the comparator unit 3, while the comparison signal Res 2 at the output 61 of the comparator unit 6 remains small, because the clutch actuator 1 is still setting the clutch correctly to the targeted position. If on the other hand the clutch actuator 1 itself is defective, both of the comparison signals (i.e., Res1 at output 31 and Res2 at output 61) will increase rapidly. It is further symptomatic of a malfunction of the clutch or clutch actuator if the comparison signal Res 1 at output 31 of the comparator unit 3 remains small, while the comparison signal Res 2 at output 61 of the comparator unit 6 shows large values.

The added possibility of detecting not only the presence but also the location of a malfunction offers considerable advantages in regard to the safety or fitness for use of a vehicle with an automated shift transmission. To compensate for a drifting-apart of the signals for the actually measured and theoretically estimated engine rpm-rate, the output signal Res2 can be returned from the comparator unit 6 through a feedback line 64 to the calculator unit 7, so that a normal amount of drifting-apart can be taken into account in calculating the theoretically estimated signal value.

Figure 3:
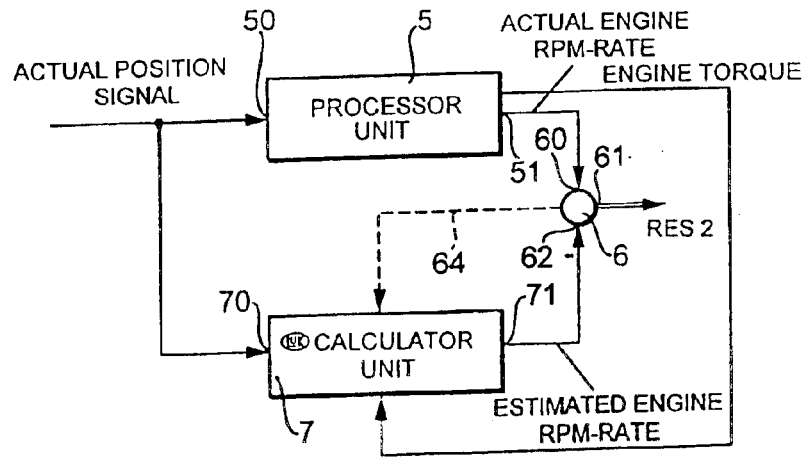
FIG. 3 represents a block diagram of a third embodiment of the invention.

FIG. 3 illustrates a simplified embodiment in which the function of monitoring the clutch actuator has been left out. Those details in FIG. 3 that have already been described in the context of FIG. 2 are identified with the same reference symbols. The embodiment of FIG. 3 does not have the emulation model 2 nor the comparator unit 3. Accordingly, the position-sensor signal representing the measured position of the clutch actuator is applied to the input 50 of the processor unit 5 and simultaneously to the input 70 of the calculator unit 7. A signal representing the actually measured engine rpm-rate is delivered from output 51 of the processor unit 5 to input 60 of the comparator unit 6; and a signal representing a theoretically estimated engine rpm-rate is delivered from output 71 of the calculator unit 7 to input 62 of the comparator unit 6. The signals from outputs 51 and 71 are compared to each other in the comparator unit 6, which delivers a comparison result (Res 2) representing the difference between the actually measured rpm-rate and the theoretically calculated rpm-rate of the engine. The comparison result Res2 is used as an indicator for detecting malfunctions of the clutch or the clutch actuator system.

Figure 4:
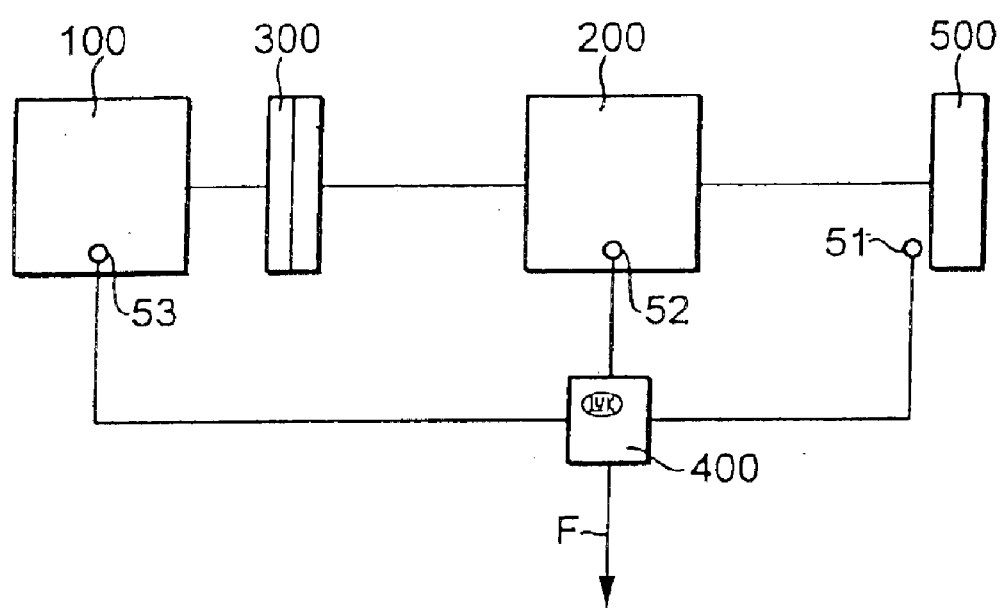
FIG. 4 represents a further developed embodiment of the invention.

An embodiment of the inventive method according to FIG. 4 serves to detect a particular type of malfunction of the clutch actuator or of the clutch itself, where the clutch does not, or not completely, disengage so that the transmission of torque through the clutch is never interrupted. Consequently, it will not be possible to put the transmission in gear, even when the engine is running. If the transmission is forcibly shifted into gear too often, this can cause damage to the synchronization.

FIG. 4 represents in block-diagram form an engine 100 transmitting a torque through a clutch 300 to the transmission 200 which, in turn, drives the wheels 500.

Three sensors, S1, S2, S3 are used to detect a situation where torque is transmitted continuously from the engine 100 to the transmission 200 by way of the clutch 300. Sensor S1 emits an electrical signal that indicates if the vehicle is standing still; sensor S3 emits an electrical signal that indicates if the engine is running; and sensor S2 emits an electrical signal that indicates if a gear that has been set in the automatically shifting transmission cannot be synchronized within a prescribed time interval. The signals of the sensors S1, S2, S3 are brought together and evaluated in a logic AND-member 400. If all three signals are affirmative, the logic device 400 sets an error flag F indicating that the clutch actuator is malfunctioning in the manner described above. In response to the error flag F, the transmission 200 is shifted into neutral.

Preferably, the error flag F is canceled if the driver indicates an intent to shift into first gear by using the selector lever of the transmission 200 before a prescribed time limit has elapsed.

The method of FIG. 4 provides an advantageous way of detecting the following malfunctions and preventing their potential consequences:
1. An undesirable condition where the clutch 200 transmits torque while the vehicle is standing still can be detected and/or avoided.
2. A defective hydraulic system or an incorrect starting procedure of a driver can be recognized.
3. A defect in the transmission actuator can be detected.
4. If the wheel rpm-rate sensor has failed and therefore indicates zero rpm, it is possible to detect inappropriate attempts to shift the transmission into first gear.

Without further analysis, the foregoing will so full reveal the gist of the present invention that others can, by applying current knowledge, readily adapt it for various applications without omitting features that, from the standpoint of prior art, fairly constitute essential characteristics of the generic and specific aspects of the above outlined contribution to the art of motor vehicles and controlling the rpm-rates of its prime mover and, therefore, such adaptations should and are intended to be comprehended within the meaning and range of equivalence of the appended claims.

What is claimed is:

1. A method of diagnosing a malfunction of a clutch of a motor vehicle with an automatically shifting transmission, comprising the steps of:

a) by means of a first sensor, generating a first electrical signal, which indicates if the motor vehicle is standing still;

b) by means of a second sensor, generating a second electrical signal, which indicates if a gear in the automatically shifting transmission cannot be synchronized within a prescribed time interval;

c) by means of a third sensor, generating a third electrical signal, which indicates if an engine of the motor vehicle is running; and d) evaluating the first, second and third electrical signals in a logic AND-member which sets an error flag indicating a malfunction in a clutch-actuator associated with the clutch if all three signals are affirmative.

2. The method of claim 1, wherein the transmission is shifted into neutral when the error flag has been set.

3. The method of claim 1, wherein the error flag is canceled if a selector lever of the transmission is actuated by a driver of the motor vehicle before a prescribed time limit has elapsed after the error flag has been set.

4. An apparatus for automatically actuating a clutch with a clutch-actuator, the clutch being associated with an automatically shifting transmission of a motor vehicle, and wherein the apparatus is configured to diagnose a malfunction of the clutch and comprises:

a) a first sensor for generating a first electrical signal that indicates if the motor vehicle is standing still;

b) a second sensor for generating a second electrical signal that indicates if a gear in the automatically shifting transmission cannot be synchronized within a prescribed time;

c) a third sensor for generating a third electrical signal that indicates if an engine of the vehicle is running; and d) a logic AND-member for evaluating the first, second and third electrical signals and setting an error flag indicating a malfunction in the clutch-actuator if all three signals are affirmative.

* * * * *